United States Patent [19]
Leugs et al.

[11] Patent Number: 5,905,111
[45] Date of Patent: May 18, 1999

[54] CONTINUOUS PROCESS FOR PREPARING ACRYLATE BASED PIGMENT PREPARATIONS

[75] Inventors: Johannes Leugs, Geleen; Johan Victor Marie Winteraeken, Einighausen/Sittard; Gerben Pieter Algra, Maastricht; Maria Gerardus Legnardus Delamboy, Scheulder; Adrianus Hendrikus Van Rooijen, Ulestraten, all of Netherlands

[73] Assignee: Ciba Specialty Chemicals Corporation, Tarrytown, N.Y.

[21] Appl. No.: 08/928,969

[22] Filed: Sep. 12, 1997

[30] Foreign Application Priority Data

Sep. 12, 1996 [EP] European Pat. Off. .............. 96810606

[51] Int. Cl.⁶ ..................................................... C08L 33/06
[52] U.S. Cl. .............................................................. 524/560
[58] Field of Search .............................................. 524/560

[56] References Cited

U.S. PATENT DOCUMENTS

| | | | |
|---|---|---|---|
| 3,637,545 | 1/1972 | Fivel | 260/4 |
| 3,770,470 | 11/1973 | Swank | 523/200 |
| 4,725,317 | 2/1988 | Wheeler | 524/413 |
| 5,229,472 | 7/1993 | Binshbergen | 525/314 |
| 5,527,859 | 6/1996 | Kempter | 525/301 |

FOREIGN PATENT DOCUMENTS

| | | |
|---|---|---|
| 0456610 | 11/1991 | European Pat. Off. . |
| 0542669 | 5/1993 | European Pat. Off. . |

OTHER PUBLICATIONS

The Canadian Journal of Chemical Engineering, vol. 71, Jun., 1993, pp. 411–418.

*Primary Examiner*—Paul R. Michl
*Attorney, Agent, or Firm*—Kevin T. Mansfield; Jacob M. Levine

[57] ABSTRACT

Process for preparing pigment preparations by mixing a colored composition with monomers and simultaneously polymerizing the monomers in an extruder at elevated temperatures, whereby the following steps are carried out:

(A) introducing continuously into an extruder
 (a) from 40 to 90% by weight of a pigment,
 (b) from 60 to 10% by weight of at least a monomer, selected from the group consisting of an acrylate and a methacrylate, whereby the amounts of pigment and monomer sum up to 100%, and, if desired,
 (c) from 0 to 10% by weight, based on the amount of component (b), of an initiator, and
(B) mixing the components (a), (b), and, if desired, (c) therein, and
(C) withdrawing continuously the obtained reaction mixture from the extruder, and a high molecular organic material pigmented with the pigment preparation.

16 Claims, No Drawings

CONTINUOUS PROCESS FOR PREPARING ACRYLATE BASED PIGMENT PREPARATIONS

The present invention relates to a process for preparing pigment preparations by mixing a colored composition with monomers and simultaneously polymerizing the monomers in an extruder at elevated temperatures.

In view of the strong tendency towards improved industrial hygiene, customers are more and more switching from powder pigments towards the use of pigment preparations. Pigment preparations however, do consist of pigment on the one hand and a carrier material on the other. Consequently, by using pigment preparations, carrier material together with the pigment are introduced into the applications system. In order to minimise possible effects of the carrier material in the end application, its concentration should be as low as possible, or, in other words, the pigment concentration should be as high as possible, while maintaining optimal dispersion properties.

In general the manufacturing processes for pigment preparations use ready-made polymers and ready-made pigments as raw materials and then disperse the pigment into the polymer material. The production process essentially consists of two steps, the separate manufacturing of the polymer material followed by pigment dispersion. EP-A 456 610 and EP-A 542 669 describe a process for the manufacture of pigment preparations comprising up to 10% by weight of a coloured composition but all in polycondensation resins, such as thermoset crosslinked resins (bulk condensation of a sulfonamide with an aldehyde) and polyamide, polyester, polycarbonate or polyurethane resins respectively, whereby the reactants (monomers) for the formation of said polycondensation resin are introduced continuously together with the coloured composition into an extruder and polymerised therein at elevated temperatures. A major drawback of these processes is the fact that only up to 10% of a colored composition can be incorporated into the polycondensation resins.

Hence, the object of this invention was to provide a process yielding pigment preparations which contain more than 10% of pigment.

Accordingly, a process for preparing pigment preparations by mixing a colored composition with monomers and simultaneously polymerizing the monomers in an extruder at elevated temperatures was found, which is characterized in (A) introducing continuously into an extruder
  (a) from 40 to 90% by weight of a pigment,
  (b) from 60 to 10% by weight of at least a monomer, selected from the group consisting of an acrylate and a methacrylate, whereby the amounts of pigment and monomer sum up to 100%, and, if desired,
  (c) from 0 to 10% by weight, based on the amount of component (b), of an initiator, and
(B) simultaneously mixing the components (a), (b), and, if desired, (c) in the extruder, and
(C) withdrawing continuously the obtained reaction mixture from the extruder.

In addition, a high molecular weight organic material pigmented with the inventive pigment preparation and a process for its preparation were found, too.

Pigments which can be used according to the instant invention are any of the solid colourants normally used in the industry for the colouring of high molecular organic material. These include organic pigments and inorganic pigments as well as carbon black. Typical organic pigments are those of the quinacridone, diketopyrrolopyrrole, anthraquinone, perylene, indigo, quinophthalone, isoindolinone, isoindoline, dioxazine, phthalocyanine or azo series, or a mixture thereof.

Examples of suitable inorganic pigments are metal oxide pigments, such as iron oxide, titanium oxide and chromium oxide, cadmium pigments, such as cadmium sulfide, bismuth pigments, such as bismuth vanadate, chromate pigments, such as lead chromate, molybdate pigments, such as lead molybdate, and the like, or a mixture thereof. Mixtures of all kinds of pigments can also be used.

The amount of pigment to be introduced into the extruder is chosen in the range of from 40 to 90, preferably from 40 to 80, more preferably from 45 to 80, most preferably from 45 to 75% by weight, based on the total amount of introduced pigment and monomer(s).

Accordingly, the amount of pigment in the inventive pigment preparation usually—depending inter alia on the degree of polymerization -is within the range of from 40 to 90, preferably from 50 to 75, and in some cases it can be as high as from 60 to 75% by weight, based on the total composition.

Acrylate monomers of particular interest for the instant invention are those of the formula

$$CH_2=CR_1-COOR_2 \qquad (I)$$

wherein $R_1$ is hydrogen or methyl $R_2$ is hydrogen, $C_1$–$C_{12}$alkyl, $CH_2$—$CH_2$—$N(R_3)(R_4)$, $CH_2$—$CH=CH_2$, $CH_2CF_3$, $CH_2$—$CH_2$—$R_3$, or $CH_2$—$CHOH$—$R_3$, $R_3$ and $R_4$ independently of each other are hydrogen or $C_1$–$C_4$ alkyl, as well as acrylonitril, acrylamide, styrene, vinylacetate, vinyl alcohol, or a mixture thereof.

$C_1$–$C_{12}$ alkyl in general is methyl, ethyl, n-propyl, isopropyl, n-butyl, sec.-butyl, i-butyl, tert.-butyl, amyl, hexyl, heptyl, octyl, 2-ethylhexyl, nonyl, decyl or dodecyl, preferably $C_1$–$C_4$ alkyl such as methyl, ethyl, n-propyl, isopropyl, n-butyl, sec.-butyl, i-butyl or tert.-butyl, more preferably methyl, ethyl and n-butyl.

Also prepolymers obtained from the above-mentioned monomers can be used.

Preferred acrylate monomers are those of formula I, wherein $R_1$ is hydrogen or methyl and $R_2$ is $C_{1-C4}$ alkyl, or a mixture thereof.

Particularly preferred are mixtures of methylmethacrylate ("MMA") and butylacrylate ("BA"), preferably from 40 to 80% b.w. of MMA and from 60 to 20% b.w. of BA, more preferably from 50 to 75% b.w. of MMA and from 50 to 25% b.w. of BA, most preferably from 60 to 75% b.w. of MMA and from 40 to 25% b.w. of BA, the total amount sums up to 100%.

The initiators to be used for the present invention in general are the initiators commonly used for polymerisations e.g. peroxydes, peresters, hydroperoxydes and some azo compounds and also mixtures thereof. Preferred initiators are selected from the group consisting of tert.-butyl peroxyneodecanoate (TBPND), tert.-butylperoxyethylhexylcarbonate (TBPEHC) tert.-amylperoxyneodecanoate (TAPND), tert.-amylperoxypivalate (TAPPI), tert.-butylperoxypivalate (TBPPI), 2,5-dimethyl-2,5-di(2-ethylhexanoylperoxy)hexane (DHPEH), tert.-amylperoxy-2-ethylhexanoate (TAPEH), tert.-butylperoxy-2-ethylhexanoate (TBPEH), tert.-butylperoxy-3,5,5-trimethylhexanoate (TBPIN) and mixtures thereof.

Particularly preferred are mixtures of tert.-butylperoxyneodecanoate and tert.-butylperoxy-ethylhexylcarbonate, preferably chosen in the range of from 50 to 85% b.w. TBPND and 50 to 15% b.w. TBPEHC, the total sum being 100%, especially preferred is a weight ratio of in the range of from (70 to 80)/(30 to 20) (TBPND/TBPEHC). The amount of initiator is preferably 2 to 8% and most preferably 3 to 5% by weight, based on the acrylic monomer.

The reaction temperature preferably is chosen in the range of from 90 to 200° C.

Generally, any kind of extruder can be used to carry out the process of the instant invention e.g. twin-screw extruders or kneading extruders, preferred are co-rotating twin-screw extruders and especially co-rotating, closely intermeshing extruders. The ratio of length to diameter (L/D) of the extruder usually is not critical, preferred is a L/D range from 20 to 80, more preferred from 35 to 60.

The polymerization reaction in the extruder takes place in analogy to known methods, as described e.g. in The Canadian Journal of Chemical Engineering, 71, June 1993.

In a preferred embodiment the components (a), (b) and, if desired (c) are mixed in a way such that the pigment is dispersed, preferred homogeneously, in the monomer material (a).

In a further preferred embodiment the reaction mixture is degassed and filtered by known means at the end of the reaction before it is withdrawn from the extruder.

The recovered pigment preparations usually are either of granular or powder form. In general, they are free-flowing, dry, low-dusting colour concentrates which are ideally suited for incorporation into a mass of the same material or a wide variety of different high molecular weight organic materials, e.g. plastic materials to give a uniformly colored plastic which can be extruded or molded into fibres, filaments, films or into paints, printing inks or other applications requiring pigment dispersion of a high degree. Typical high molecular weight organic materials which can be coloured with the pigment preparations obtained according to the instant invention include cellulose ethers and esters, typically ethyl cellulose, nitro cellulose, cellulose acetate, cellulose butyrate, natural resins or synthetic resins, typically polymerisation or condensation resins, such as aminoplasts, preferably urea/formaldehyde and melamine/formaldehyde resins, alkyd resins, phenolic plastics, polycarbonates, polyolefins, polystyrene, polyvinyl chloride, polyamides, polyurethanes, polyester, ABS, polyphenylene oxides, rubber, casein, silicone and silicone resins, singly or in mixtures.

Hence, another embodiment of this invention relates to a high molecular weight organic material which is pigmented with a desired amount of the inventive pigment preparation. A further embodiment relates to a process for the preparation of the pigmented high molecular organic material by blending the inventive pigment preparations with the high molecular organic material by known processes.

The inventive pigment preparations obtained by the process of the present invention can be used in an amount of 0.01 to 50% by weight, preferably of 0.2 to 20% by weight, based on the high molecular weight organic material to be pigmented.

Having described the invention generally, the following examples are given to illustrate specific embodiments of the invention. All parts and percentages are by weight unless otherwise indicated.

EXAMPLE 1

A loss-in-weight-feeder is filled with 30 kg of a yellow lead chromate pigment (Hornachrome Yellow GMXAH-25). A dosing vessel is flushed with nitrogen and charged with methylmethacrylate monomer (MMA) and butylacrylate monomer (BA) at a weight ratio of 60:40 (MMA:BA), 30 kg's in total. A second dosing vessel is charged with 3 kg's of a peroxide mixture of TBPND and TBPEHC in a weight ratio of 70:30 (TBPND: TBPEHC). The pigment, the monomer mixture and the initiator mixture are metered into a co-rotating twin screw extruder with L/D=40 with throughputs of 5.85 kg/h (pigment), 3.15 kg/h (monomer mixture) and 0.095 kg/h (initiator mixture), respectively. The extruder is divided into 13 zones, all having the same length, and each zone is heated individually. The following temperature profile is applied (1=input zone, 13=output zone):

zone  1  2  3  4  5  6   7   8   9  10  11  12  13
T[°C.]30 30 30 60 90 120 150 150 120 120 150 150 160

The melt is degassed in zone 9 at a pressure of 5 mbar, and extruded and filtered in zone 12. The extrudate is collected in a container, broken and ground. The yield of the polymerization reaction is 98%.

EXAMPLE 2

A loss-in-weight-feeder is filled with 30 kg of a yellow lead chromate pigment (Hornachrome Yellow GMXAH-25). A dosing vessel is flushed with nitrogen and charged with methylmethacrylate monomer (MMA) and butylacrylate monomer (BA) at a weight ratio of 75:25 (MMA:BA), 30 kg's in total. A second dosing vessel is charged with 3 kg's of a peroxide mixture of TBPND and TBPEHC in a weight ratio of 70:30 (TBPND: TBPEHC). The pigment, the monomer mixture and the initiator mixture are metered into a co-rotating twin screw extruder with UD =40 with throughputs of 5.85 kg/h (pigment), 3.15 kg/h (monomer mixture) and 0.095 kg/h (initiator mixture), respectively. The extrusion is carried out in the same way (same parameters) as described in example 1. The extrudate is collected in a container, broken and ground. The yield of the polymerization reaction is 95%. The weight average molecular weight ($M_w$) of the copolymer is about 25000 g/mol. The number average molecular weight ($M_n$) is about 8800 g/mol giving a polydispersity of 2.8.

EXAMPLE 3

A loss-in-weight-feeder is filled with 25 kg of a green phthalocyanine pigment (Acnalin Supra Green FG from BASF; C.I. Pigment Green 7). A dosing vessel is flushed with nitrogen and charged with methylmethacrylate monomer (MMA) and butylacrylate monomer (BA) at a weight ratio of 60:40 (MMA:BA), 30 kg's in total. A second dosing vessel is charged with 3 kg's of a peroxide mixture of TBPND and TBPEHC in a weight ratio of 70:30 (TBPND: TBPEHC). The pigment, the monomer mixture and the initiator mixture are metered into a co-rotating twin screw extruder with L/D=40 with throughputs of 2.5 kg/h (pigment), 2.5 kg/h (monomer mixture) and 0.10 kg/h (initiator mixture), respectively. The extrusion is carried out in the same way (same parameters) as described in example 1. The extrudate is collected in a container, broken and ground. The yield of the polymerization reaction is 98%. The weight average molecular weight ($M_w$) of the copolymer is about 32,400 g/mol. The number average molecular weight ($M_n$) is about 14,200 g/mol, giving a polydispersity of 2.3.

Example 4

A loss-in-weight-feeder is filled with 25 kg of a red DPP pigment (Ciba; CHROMOPHTHAL®DPP Red BP, C.I.

Pigmenbt Red 254). A dosing vessel is flushed with nitrogen and charged with methylmethacrylate monomer (MMA) and butylacrylate monomer (BA) at a weight ratio of 60:40 (MMA:BA), 30 kg's in total. A second dosing vessel is charged with 3 kg's of a peroxide mixture of TBPND and TBPEHC in a weight ratio of 70:30 (TBPND: TBPEHC). The pigment, the monomer mixture and the initiator mixture are metered into a co-rotating twin screw extruder with L/D =40 with throughputs of 2.50 kg/h (pigment), 2.50 kg/h (monomer mixture) and 0.100 kg/h (initiator mixture), respectively. The extrusion is carried out in the same way (same parameters) as described in example 1. The extrudate is collected in a container, broken and ground. The yield of the polymerisation reaction is 99%. The weight average molecular weight ($M_w$) of the copolymer is about 31,200 g/mole. The number average molecular weight ($M_n$) is about 10,100 g/mole giving a polydispersity of 3.1.

EXAMPLE 5

A loss-in-weight-feeder is filled with 25 kg of a blue phthalocyanine pigment (C.I. Pigment Blue 15; Acnalin Supra Blue G from BASF). A dosing vessel is flushed with nitrogen and charged with methylmethacrylate monomer (MMA) and butylacrylate monomer (BA) at a weight ratio of 70:30 (MMA:BA), 30 kg's in total. A second dosing vessel is charged with 3 kg's of a peroxide mixture of TBPND and TBPEHC in a weight ratio of 70:30 (TBPND: TBPEHC). The pigment, the monomer mixture and the initiator mixture are metered into a co-rotating twin screw extruder with L/D =52 with throughputs of 4.40 kg/h (pigment), 3.60 kg/h (monomer mixture) and 0.216 kg/h (initiator mixture), respectively. The extruder is divided into 16 zones, all having the same length, and each zone is heated individually. The following temperature profile is applied (1=input zone, 16=output zone):

| zone | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| T[°C.] | 30 | 30 | 30 | 60 | 90 | 120 | 150 | 150 | 150 | 150 | 150 | 120 | 120 | 150 | 150 | 160 |

The melt is degassed in zone 12 at a pressure of 5 mbar, and extruded and filtered in zone 15. The extrudate is collected in a container, broken and ground. The yield of the polymerisation reaction is 93%. The weight average molecular weight ($M_w$) of the copolymer is about 13900 g/mol. The number average molecular weight ($M_n$) is about 7000 g/mol giving a polydispersity of 2.0.

EXAMPLE 6

A loss-in-weight-feeder is filled with 25 kg of a red cinquasia pigment C.I. Pigment Violet 19; Acramin Pink BN). A dosing vessel is flushed with nitrogen and charged with methylmethacrylate monomer (MMA) and butylacrylate monomer (BA) at a weight ratio of 70:30 (MMA:BA), 30 kg's in total. A second dosing vessel is charged with 3 kg's of a peroxide mixture of TBPND and TBPEHC in a weight ratio of 70:30 (TBPND: TBPEHC). The pigment, the monomer mixture and the initiator mixture are metered into a co-rotating twin screw extruder with L/D=52 with throughputs of 4.40 kg/h (pigment), 3.60 kg/h (monomer mixture) and 0.216 kg/h (initiator mixture), respectively. The extrusion is carried out in the same way (same parameters) as described in example 5. The extrudate is collected in a container, broken and ground. The yield of the polymerisation reaction is 94%. The weight average molecular weight ($M_w$) of the copolymer is about 17600 g/mol. The number average molecular weight ($M_n$) is about 7100 g/mol giving a polydispersity of 2.5.

EXAMPLE 7

A loss-in-weight-feeder is filled with 25 kg of a rubine DPP pigment (Ciba; IRGAZIN®DPP RUBINE TR, C.I.Pigment Red 264). A dosing vessel is flushed with nitrogen and charged with methylmethacrylate monomer (MMA) and butylacrylate monomer (BA) at a weight ratio of 61:39 (MMA:BA), 30 kg's in total. A second dosing vessel is charged with 3 kg's of a peroxide mixture of TBPND and TBPEHC in a weight ratio of 80:20 (TBPND: TBPEHC). The pigment, the monomer mixture and the initiator mixture are metered into a co-rotating twin screw extruder with L/D=52 with throughputs of 2.40 kg/h (pigment), 3.60 kg/h (monomer mixture) and 0.144 kg/h (initiator mixture), respectively. The extrusion is carried out in the same way (same parameters) as described in example 5. The extrudate is collected in a container, broken and ground. The yield of the polymerisation reaction is 98%.

EXAMPLE 8

A loss-in-weight-feeder is filled with 30 kg of $TiO_2$ (C.I.Pigment White 6, Aquatone White Plus). A dosing vessel is flushed with nitrogen and charged with methylmethacrylate monomer (MMA) and butylacrylate monomer (BA) at a weight ratio of 61:39 (MMA:BA), 30 kg's in total. A second dosing vessel is charged with 3 kg's of a peroxide mixture of TBPND and TBPEHC in a weight ratio of 80:20 (TBPND: TBPEHC). The pigment, the monomer mixture and the initiator mixture are metered into a co-rotating twin screw extruder with L/D=52 with throughputs of 6.00 kg/h (pigment), 2.00 kg/h (monomer mixture) and 0.080 kg/h (initiator mixture), respectively. The extrusion is carried out in the same way (same parameters) as described in example 5. The extrudate is collected in a container, broken and ground. The yield of the polymerisation reaction is 95%.

EXAMPLE 9

2.91 kg of polymethylmethacrylate (DIAKON®LG 156, ICI; Vicat softening point (full) (5kg load) (DIN 53460 B): 95° C., melt flow index (1 kg) acc. to ASTM D1238-73:16 g/10 min) is dried at 70° C. for two hours and mixed with 0.09 kg of the product obtained in Example 2. The mixture is tumbled, processed on a twin screw extruder at 200° C., granulated and dried again at 70° C. The granulated product is injection moulded at 240° C. In the same way as PMMA, the pigment preparation obtained in example 2 is tested with the following test compounds:

polyethylene (PE, Stamylex, DSM)

polystyrene (N3000 from SHELL; melt flow index MFI 200/5 (DIN 53735): 9 g/10 min)

polypropylene (PP, Moplen®Z30S, DSM)

acrylonitril-styrene-acrylate (ASA, Luran®776 S/SE, BASF; Vicat soft.point (VST/A/50:104° C.)

acrylonitril-butadiene-styrene (ABS, Ronfalin®FX50, DSM)

polyamide (PA, Ultramid®B35K, BASF)

polybutyleneterephtalate (PBT, Crastin®S600, Ciba)

polycarbonate (MAKROLON®2800, BAYER, Vicat (VST/B/120): 148° C.)

None of the moulded plates shows incompatibility effects between the pigment preparation obtained in example 2 and the test compound.

Moreover, preparations as manufactured according to examples 4–6 are tested in the above mentioned application example as well. During these extensive test series the following polymers instead of polymethylmethacrylate are used:

polystyrene (PS, N3000 from SHELL; melt flow index MFI 200/5 (DIN 53735): 9 g/10 min) acrylonitril-styrene-acrylate (ASA, Luran®776 S/SE, BASF; Vicat soft.point (VST/A/50:104° C.)

polyamide (PA, Ultramid®B35K, BASF) polybutylene-terephtalate (PBT, Crastin®600, Ciba)

polycarbonate (MAKROLON®2800, BAYER, Vicat (VST/B/120):148° C.)

None of the moulded plates shows incompatibility effects between the pigment preparations obtained in examples 4–6 and the test compound.

EXAMPLE 10

A 100 ml flask is filled with 40 ml glass beads, 23.07 g of the pigment preparation obtained in example 1 and 30.0 g binder Polyamide ink (consisting of 25.37 parts of polyamide resin EURELON 931® (WHITCO), 7.46 parts of urea-aldehyde resin LAROPAL®K80 (BASF; softening point (DIN 53180): 75–85° C., acid number (ISO 3682, DIN 53402): max. 1 mg KOH/g), 2.24 parts Wax AL3 (BASF) and 64.93 parts of a solvent mixture (n-propanol: isopropanol: WHITE SPIRIT 140F (SHELL; CAS-No. 64742-88-7, aliphatic hydrocarbon with a boiling point of 180–210° C., density (15° C., ASTM D 1298): 0.788 g/cm$^3$) (=1:1:1). The mixture is dispersed on a Skandex paint shaker for 60 minutes and applied to a black-white application form. No incompatibility effects are observed.

EXAMPLE 11

For the full shade application a 100 ml glass jar is filled with 40 ml glass beads, 26.9 g of the product of example 2, 5.0 g solvent mixture—consisting of 41.2 parts butylglycolacetate, 29.4 parts butylacetate and 29.4 parts xylene—and 12.5 g grinding vehicle consisting of 70 parts of a hydroxyl groups containing acrylic resin, MACRYNAL®SM 510n (HOECHST; Gardner Color Standard (ASTM D 1544): <2, hydroxyl number (DIN 53783): ca. 150 mg KOH/g of solid resin), 24 parts of said solvent mixture, 3 parts PERENOL®RE1 (HENKEL; slipadditive, density (20° C.): 0.815–0.835 g/cm$^3$, solid contents: 24–28%) and 3 parts of polysiloxane blockcopolymer VP-PERENOL®S4 (HENKEL; density (20° C.): 0,950–0, 970 g/cm$^3$, solid contents: 47–50%). The mixture is dispersed on a Skandex paint shaker for about 20 minutes. Then 22.5 g of acrylic resin MACRYNAL®SM 510n is added and dispersed again for 5 minutes.

For the 1:10 TiO$_2$ white reduction the same procedure as for the full shade application is followed. However, 2.69 g instead of 26.9 g of the product of example 2 and 17.5 g TiO$_2$ (RCR-2) are used.

For the full shade application as well as the 1:10 TiO$_2$ white reduction 15.5 g of an aliphatic polyisocyanate DESMODUR®N75® (BAYER; ca. 75% in 1-methoxypropyl acetate-2/xylene (1:1), based on hexamethylene-1,6-diisocyanate, density (DIN 53217, 20° C.): 1.07 g/cm$^3$, viscosity (DIN 53211): 59 s) is added immediately before application. The mixtures are drawn down on a black-white application board. The applications are allowed to evaporate for 30 minutes whereafter they are allowed to cure for another 30 minutes.

The applications show no incompatibility effects with the carrier system of the pigment preparation.

EXAMPLE 12

A premix is made by mixing 339 g of a satureated, carboxylated polyester resin, URALAC®P5401 (DSM; viscosity (TM 2005): 200–400 dPass), 25.5 g of triglycidyl isocyanurate (imparts good weather resistance, ARALDITE®PT 810 (CIBA), 7 g of an acrylate copolymer, adsorbed on SiO$_2$ (as an anti-crater and levelling additive) BYK®365P (Byk-Chemie; acrylate content: 63%, residue after calcining: 33%, apparent density (DIN 53468): 650 g/l), 3.5 g benzoin, 38 g of the pigment preparation obtained in example 1, 75 g TiO$_2$ and 12 g of BaSO$_4$ (Blanc Fixe F from Sachtleben) in a kitchenette for 3 times 15 s. The premix is extruded on a Prism 16 mm twin screw extruder. A temperature profile is applied to the different zones of the extruder within the range of from 65 to 1 10° C. After cooling, the extrudate is ground and sieved through a 100 μm sieve. The powder is sprayed with a Wagner ESB EPG 2020CG electrostatic spray gun on an aluminum Q panel. The panel is allowed to cure at 180° C. in an air circulated oven during 20 minutes. The application shows no incompatibility effects.

Pigment preparations as manufactured according to examples 4–8 are tested in exactly the same manner. These preparations do not show incompatibility effects either.

EXAMPLE 13

300 ml of a mill base consisting of 48.32% of a non-drying, short oil alkyd resin based on synthetic fatty acids, SETAL 84 XX-70 (Akzo-Nobel; fatty acids content: 28%, phthalic anhydride content: 45%, density (DIN 53217) 1.08 g/cm$^3$), 18.76% of a non-plasticized melamine resin, SETAMINE US132-BB-70 (Akzo-Nobel; density (DIN 53217): 1.02 g/cm$^3$, flash point (DIN 53213): 35° C., non-volatiles (ISO 3251): 69–73%), 21.86% of a mixture of aromtic hydrocarbons (having a mean value of 120 g/mol, boiling point: 162–176° C.) SOLVESSO®100 (Esso), 4.50% butanol, 2.25% Depanol J (Hoechst), 2.25% Isophoron 563 (Hüls), 0.04% Baysilone-Lackadditive MA (Bayer) and 2.02% xylene is prepared.

200 g of a white paint consisting of 24% TiO$_2$ and 76% of the mill base is prepared by dispersing the mixture with a dispermat until the particle size is <10 μm.

A 100 ml flask is filled with 40 ml glass beads, 11 ml of the mill base and 4.0 g of a phthalocyanine green powder pigment. The mixture is dispersed on a Skandex paint shaker for 60 minutes and let down with 26 ml of the mill base.

Then half of the contents of the flask (without glass beads) is added to 100 g of the white paint and the mixture is stirred for about 5 minutes (1:12 reduction).

An application is made by drawing a film on a black and white cardboard by means of a wire bound. Thereafter a rub out test is performed. Finally, the application is dried at ambient temperatures for 5 minutes and at 160° C. for 6 minutes.

Then 4.0 g of preparation of Example 3 is added to 100 g of the white paint and the mixture is stirred for 20 minutes. After 5, 10, 15 and 20 minutes an application is made as described above.

The applications are compared to the application based on the powder pigment. It is shown that the colour strength is fully developed when using the preparation of example 3 compared to the application based on the powder pigment. Besides, the application based on the preparation of example 3 shows a better gloss.

Pigment preparations as manufactured according to examples 4–6 are tested in exactly the same manner. These preparations show complete colour strength development and a better gloss also. Incompatibility effects are not observed.

We claim:

1. Process for preparing pigment preparations by mixing a colored composition with monomers and simultaneously polymerizing the monomers in an extruder at elevated temperatures, which comprises
   (A) introducing continuously into an extruder
      (a) from 40 to 90% by weight of a pigment,
      (b) from 60 to 10% by weight of at least one monomer selected from the group consisting of acrylates and methacrylates, whereby the amounts of pigment and monomer sum up to 100%, and,
      (c) from 0 to 10% by weight, based on the amount of component (b), of an initiator, and
   (B) simultaneously mixing the components (a), (b), and, optionally, (c) in the extruder, and
   (C) continuously withdrawing the reaction mixture obtained from the extruder.

2. Process according to claim 1, wherein the components are mixed in a way such that the pigment is dispersed in the monomer material.

3. Process according to claim 2, wherein the components are mixed in a way such that the pigment is homogeneously dispersed in the monomer material.

4. Process according to claim 1, wherein the reaction mixture is degassed and filtered at the end of the reaction before it is withdrawn.

5. Process according to claim 2, wherein the reaction mixture is degassed and filtered at the end of the reaction before it is withdrawn.

6. Process according to claim 1, wherein the acrylate monomer is selected from the group consisting of acrylates of the formula $$CH_2=CR_1-COOR_2 \quad (I),$$

wherein
   $R_1$ is hydrogen or methyl,
   $R_2$ is hydrogen, $C_1-C_{12}$ alkyl, $CH_2-CH_2-N(R_3)(R_4)$, $CH_2-CH=CH_2$, $CH_2CF_3$, $CH_2-CH_2OR_3$ or $CH_2-CHOH-R_3$, or
   $R_3$ and $R_4$ independently of each other are hydrogen or $C_1-C_4$ alkyl,
   or a mixture thereof.

7. Process according to claim 6, wherein the monomer additionally contains acrylonitrile, acrylamide, styrene, vinylacetate or vinyl alcohol, or a mixture thereof.

8. Process according to claim 6, wherein the acrylate monomer is of the formula (I) wherein $R_1$ is hydrogen or methyl and $R_2$ is hydrogen or $C_1-C_4$ alkyl, or a mixture thereof.

9. Process according to claim 8, wherein the monomer is a mixture of methyl methacrylate and butyl acrylate.

10. Process according to claim 9, wherein the monomer is a mixture of 40 to 80% b.w. of methyl methacrylate and 60 to 20% b.w. of butyl acrylate.

11. Process according to claim 1, wherein the amount of initiator is 2 to 8% by weight.

12. Process according to claim 1, wherein the initiator is selected from the group consisting of tert.-butyl peroxyneodecanoate, tert.-butylperoxyethylhexylcarbonate, tert.-amylperoxyneodecanoate, tert.-amylperoxypivalate, tert.-butylperoxypivalate, 2,5-dimethyl-2,5-di(2-ethyl hexanoylperoxy)hexane, tert.-amylperoxy-2-ethylhexanoate, tert.-butylperoxy-2-ethylhexanoate, tert.-butylperoxy-3,5,5-trimethylhexanoate, and mixtures thereof.

13. Process according to claim 1, wherein the pigment is an organic pigment of the quinacridone, diketopyrrolopyrrole, anthraquinone, perylene, indigo, quinophthalone, isoindolinone, isoindoline, dioxazine, phthalocyanine or azo series, or a mixture thereof.

14. Process according to claim 1, wherein the pigment is an inorganic pigment and is a metal oxide pigments, a cadmium pigment, a chromate pigment, a molybdate pigment, or a mixture thereof.

15. Process according to claim 1, wherein the reaction temperature is in the range of from 90 to 200° C.

16. Process according to claim 1, wherein the extruder is a twin-screw extruder.

* * * * *